UNITED STATES PATENT OFFICE.

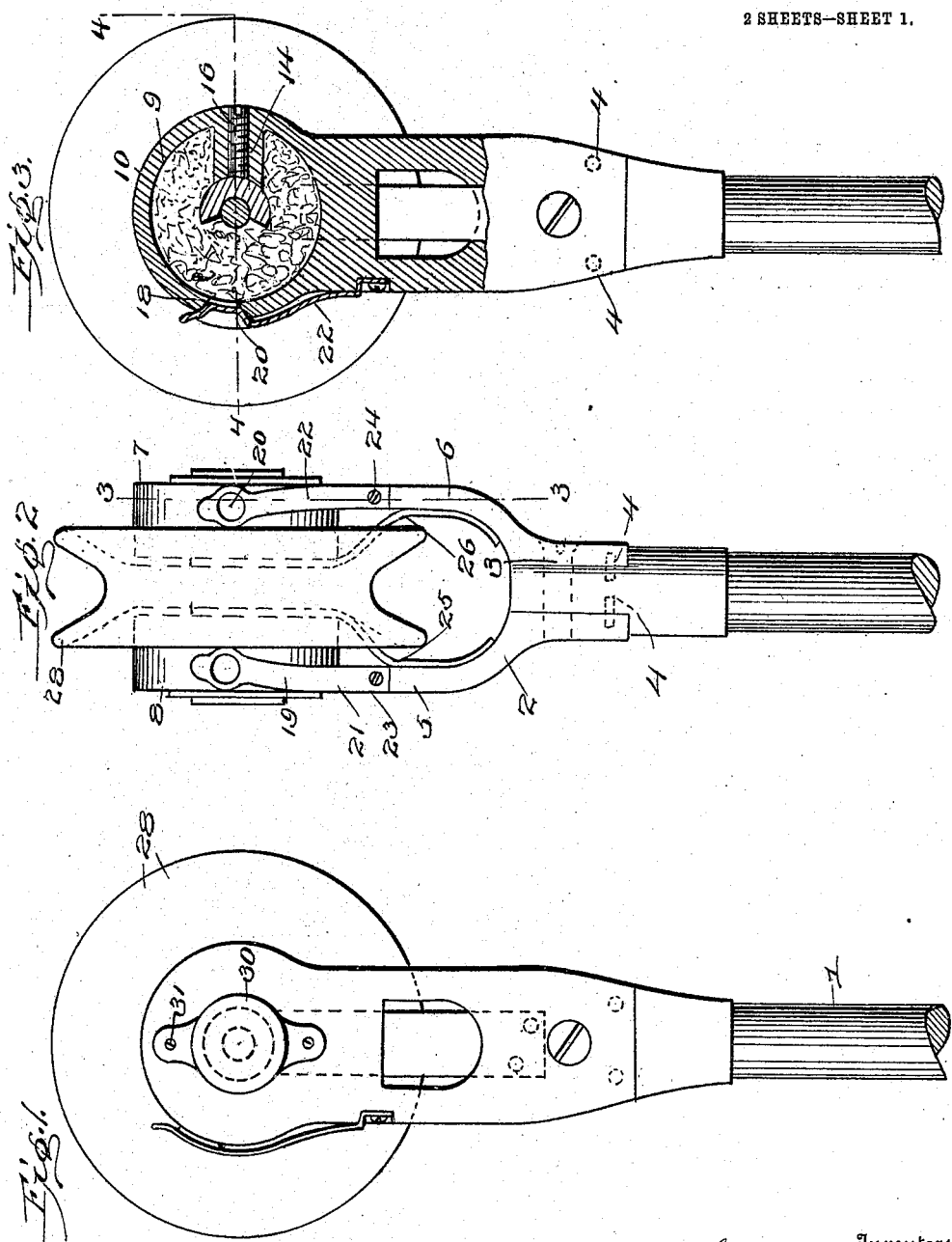

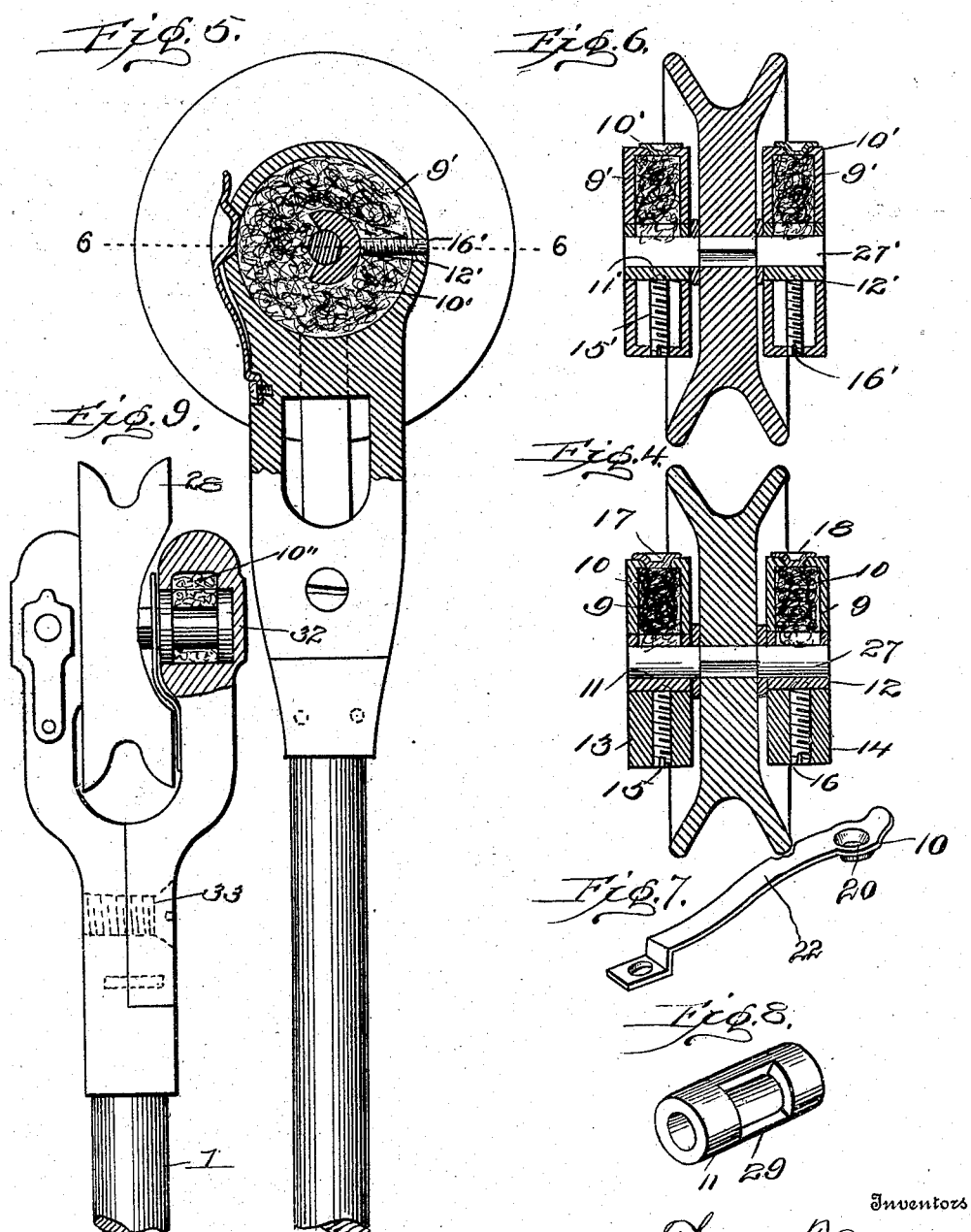

THOMAS F. BRENNAN AND THOMAS J. MULLEN, OF NEW YORK, N. Y.

TROLLEY-HARP.

No. 908,068.　　　Specification of Letters Patent.　　　Patented Dec. 29, 1908.

Application filed June 4, 1908. Serial No. 436,714.

*To all whom it may concern:*

Be it known that we, THOMAS F. BRENNAN and THOMAS J. MULLEN, citizens of the United States, residing at New York city, in the county of New York and State of New York, have invented certain new and useful Improvements in Trolley-Harps; and we do hereby declare the following to be a full, clear, and exact description of the invention, such as will enable others skilled in the art to which it appertains to make and use the same.

This invention relates to improvements in trolley harps, and particularly to means for oiling the axle or bearing shaft of the trolley wheel, and has for an object the provision of an oiling device arranged to automatically and continuously feed the bearing shaft of the trolley wheel with oil regardless of the position of the trolley pole.

Another object of the invention is the provision of a trolley harp arranged with hollow ends for receiving oil or graphite and waste, a bearing sleeve passing through the hollow portions of the harp and formed with a cut out portion for accommodating the waste and for permitting oil to be fed to the interior of the sleeve, and an axle or bearing shaft rotatable with the trolley wheel having its ends positioned in said sleeves.

With these and other objects in view the invention comprises certain novel constructions, combinations, and arrangement of parts as will be hereinafter more fully described and claimed.

In the accompanying drawings: Figure 1 is a side elevation of a trolley harp and wheel. Fig. 2 is an edge view of the structure shown in Fig. 1. Fig. 3 is a section through Fig. 2, approximately on line 3—3. Fig. 4 is a section through Fig. 3 on line 4—4. Fig. 5 is a section similar to the section shown in Fig. 3, except the same is taken through a slightly modified form of harp in which the oil receiving member extends entirely around the central sleeve. Fig. 6 is a section through Fig. 5 on line 6—6. Fig. 7 is a detail perspective view of a spring cap, and means for stopping the aperture through which oil is fed into the harp. Fig. 8 is a detail perspective view of one of the bearing sleeves. Fig. 9 is an edge view similar to Fig. 2, certain parts being broken away, of the modified form of trolley harp.

Referring to the drawing by numerals, 1 indicates a trolley pole of any desired construction, and 2 a harp secured thereto. The sides of the harp are preferably held in place by a screw 3, and also a pair of brads 4—4. Respective arms 5 and 6 are formed with enlarged portions at 7 and 8 which are formed centrally with hollowed out portions 9—9 that are adapted to be filled with packing or waste 10—10. The hollowed out portions 9—9 extend substantially the entire distance around bearing sleeves 11 and 12. The short interruption formed by lugs 13 and 14 breaks the continuity of the openings 9—9 and forms means for receiving set screws 15 and 16. Enlarged portions 7 and 8 are provided with apertures or openings 17 and 18 through which oil or lubricant of any desired kind as for instance graphite, may pass into hollowed out portions 9—9. Spring caps 19 and 20 are provided for closing apertures 17 and 18. The caps 19 and 20 are formed with spring shanks 21 and 22 which are firmly secured in place at 23 and 24 by any suitable means, as a screw. The spring shanks 21 and 22 are arranged to normally press cap portions 19 and 20 tightly in the apertures 17 and 18 so as to positively prevent the escape of any oil, and also to prevent any foreign substance from entering into the cavities or hollowed out portions 9—9.

A pair of springs 25 and 26 are provided that are secured to the respective arms or sides 5 and 6 of the trolley harp and that are adapted to surround the shaft 27 and to be normally pressed against the trolley wheel 28. The ends of the respective springs are arranged to have an aperture pass therethrough so as to entirely encircle the axle or bearing shaft 27. The apertures, however, in the end of the springs are made sufficiently large to permit a free longitudinal motion along the axle or journal 27 to compensate for any side motion of the trolley wheel 28. These springs provide a scraping or frictional contact for conducting the current from the trolley wheel to the harp, so as to provide a much easier path for the flow of current than through the journal bearing. The axle 27 is preferably made square (Fig. 4) centrally so as to engage a square hole in the trolley wheel 28. It will be evident that the axle 27 could be made round or any other shape and be secured in place by any desired means as, for instance, a key so as to rotate with the trolley wheel. The outer ends of the axle 27, however, are rounded in order to snugly fit within sleeves 11 and 12 which sleeves or bushings are made from any desired material, as, for instance, bronze composition, for affording a bearing for the journal member or axle 27. If desired the bushings may be lined with graphite in order to assist in the lubrication of the axle 27. In order to provide a positive automatic and continuous feed of lubricant to the axle 27 the sleeves 11 and 12 are cut out at 29 and 30 respectively which exposes the rounded ends of axle 27 to the filling 10—10.

In use oil or any desired lubricant is passed into the respective chambers or hollowed out portions 9—9 until the same is partially filled, and then the waste or packing material 10—10 is forced into the hollowed out portion 9—9 until the hollowed out portions 9—9 are filled. The oil will be absorbed by the filling, and will consequently be distributed throughout hollowed out portions 9—9. In packing the chambers or hollowed out portions 9—9 the same must be filled sufficiently for causing the same to lie in the cut out portions 29 and 30 against the sides of axle 27 so that axle 27 may be continuously lubricated by capillary attraction. If desired the packing may be placed in the chamber or hollowed out portions 9—9 first, and usually this is the preferable procedure. After the packing has been properly placed in position the same is thoroughly saturated with oil or any desired lubricant which is fed, as heretofore stated, by capillary attraction to the axle 27. It will be observed that the openings 29 and 30 expose almost half of the circumference of the ends of axle 27 so that ample means are provided for permitting the packing to lie against the shaft for automatically and continuously feeding lubricant thereto. It will also be noted that the openings 29 and 30 are positioned opposite the point against which shaft 27 continuously bears so that a continuous bearing is provided for the shaft during operation. Set screws 15 and 16 are provided for positively holding the sleeves 11 and 12 in their correct position.

The harp 2 has been set forth as being made in a plurality of parts, but it will be evident that the same may be made in one part and provided with chambers 9—9 and other associated structures for accomplishing the same results.

In order to prevent the escape of oil or the entrance of dirt into the bearings a cap 30 is secured to the harp and covers the respective ends of the sleeves 11 and 12, and also of axle 27. This cap is adapted to be a tight fitting cap so as to prevent the entrance of dirt and the escape of oil, but may be removed whenever desired by removing the holding screws 31.

In Figs. 5 and 6 will be seen a slightly modified form of harp, the modification lying in the fact that the chambers 9'—9' are formed continuous and are not provided with projections as 13 and 14, but the set screws 15' and 16' pass through the outer shell of the housings 9'—9' and through the chambers or open part of the housings and engage the respective sleeves 11' and 12'. The sleeves are cut away at 29' and 30' similar to the preferred construction in order to accommodate filling 10'—10' which is adapted to lie against the axle 27'. The packing 10' as well as packing 10 may be made from wool waste, wool yarn, or any desired packing of any material that will feed the oil by capillary attraction to the axle 27 or 27' as the case may be so that the oil cavities or chambers 9—9 may be filled with the packing, and then the packing thoroughly saturated. This construction also has the advantage of supplying only sufficient lubricant to the respective moving parts that will be required for proper lubrication. This will prevent the waste of lubricant, and also obviate the necessity of looking after lubricating the trolley except at long intervals.

In Fig. 9 will be seen a slightly modified form of harp that is formed with a hollow receptacle or chamber 10'' and adapted to accommodate an axle or shaft as shown in the preferred structure. In this structure, however, a raised portion 32 takes the place of the cap 30 and positively prevents the escape of oil or the entrance of dirt. In a harp of this character the same is made in parts so as to permit the insertion of the axle and is then bolted or secured together by any desired means as by a screw 33. The enlarged portion 32 is adapted also to strengthen the harp at this place as well as afford a protection for the bearings.

What we claim is:

1. A trolley harp provided with spaced arms, chambers carried by the arms and having registering openings, a trolley wheel mounted between the arms, an axle for the wheel within the chambers, journal sleeves insertible through the openings and upon the axle, and closures for the openings adapted to position the sleeves.

2. A trolley harp provided with spaced arms, chambers carried by the arms and having registering openings, a trolley wheel mounted between the arms, an axle for the wheel within the chambers, journal sleeves insertible through the openings and upon the axle, and provided with lubricating passages, and closures for the openings independent of and adapted to position the sleeves.

3. A trolley harp provided with spaced arms, chambers carried by the arms and having registering journal openings and lubricating openings, a trolley wheel mounted between the arms, an axle for the wheel within the chambers, journal sleeves insertible through the openings and upon the axle, and provided with lubricating passages, closures for the journal openings independent of and adapted to maintain the sleeves in position, and a spring-pressed closure for the lubricating openings.

In testimony whereof we affix our signatures in presence of two witnesses.

THOMAS F. BRENNAN.
THOMAS J. MULLEN.

Witnesses:
G. R. BROWN,
J. H. SEARLE.